US008549637B2

(12) United States Patent
Alhamed et al.

(10) Patent No.: US 8,549,637 B2
(45) Date of Patent: Oct. 1, 2013

(54) WEBSITE DEFACEMENT INCIDENT HANDLING SYSTEM, METHOD, AND COMPUTER PROGRAM STORAGE DEVICE

(76) Inventors: Mohammed Alhamed, West Henrietta, NY (US); Omar M. Alsuhaibany, Riyadh (SA)

( * ) Notice: Subject to any disclaimer, the term of this patent is extended or adjusted under 35 U.S.C. 154(b) by 0 days.

(21) Appl. No.: 13/473,170

(22) Filed: May 16, 2012

(65) Prior Publication Data

US 2013/0097702 A1 Apr. 18, 2013

Related U.S. Application Data

(60) Provisional application No. 61/546,260, filed on Oct. 12, 2011.

(51) Int. Cl.
*G06F 11/00* (2006.01)
(52) U.S. Cl.
USPC .............................................. 726/22; 726/25
(58) Field of Classification Search
USPC ..................... 726/22–25; 709/201–203, 224, 709/225; 713/188
See application file for complete search history.

(56) References Cited

U.S. PATENT DOCUMENTS

| 7,313,823 | B2 | 12/2007 | Gao |
| 2004/0003248 | A1 | 1/2004 | Arkhipov |
| 2005/0120239 | A1 | 6/2005 | Monroe et al. |
| 2007/0074169 | A1 | 3/2007 | Chess et al. |
| 2010/0107247 | A1 | 4/2010 | Shani |
| 2011/0083185 | A1 | 4/2011 | Sheleheda et al. |

FOREIGN PATENT DOCUMENTS

WO 2004/008337 1/2004

OTHER PUBLICATIONS

Koen Smets et al., "Automatic Vandalism Detection in Wikipedia: Towards a Machine Learning Approach", Association for the Advancement of Artificial Intelligence, pp. 43-48, Jul. 13, 2008.

*Primary Examiner* — Nirav B Patel
(74) *Attorney, Agent, or Firm* — Oblon, Spivak, McClelland, Maier & Neustadt, L.L.P.

(57) ABSTRACT

A website defacement incident handling system and associated methodology and non-transitory computer program storage device for detecting a defacement of a website and taking appropriate corrective action upon detection of the defacement. The website defacement incident handling system receives web page information and snapshot images corresponding to websites and performs comparisons against corresponding information and snapshot images of a reference website. Probability scores indicating the likelihood that a website has been defaced are calculated based on the comparisons and corrective actions are taken as appropriate to protect the affected website.

17 Claims, 12 Drawing Sheets

WEBSITE DEFACEMENT INCIDENT HANDLING SYSTEM, METHOD, AND COMPUTER PROGRAM STORAGE DEVICE

GRANT OF NON-EXCLUSIVE RIGHT

This application was prepared with financial support from the Saudia Arabian Cultural Mission, and in consideration therefore the present inventors have granted The Kingdom of Saudi Arabia a non-exclusive right to practice the present invention.

BACKGROUND

1. Field of Disclosure

This disclosure relates to a website defacement incident handling system and associated methodology and non-transitory computer program storage device for detecting a defacement of a website and taking appropriate corrective action upon detection of the defacement.

2. Description of Related Art

Businesses are increasingly relying on websites to market and sell products directly to consumers. In many cases, a website acts as a virtual storefront for businesses operating exclusively online and therefore maintaining the appearance of the website such that only authorized content is displayed to potential customers is of heightened importance.

Additionally, individual users often create websites to display content or to convey information to other Internet users. Thus, the appearance of the website is essentially an extension of the individual who created it and therefore maintaining the integrity of the website's appearance is also important.

Computer hackers pose a threat to a business or individual operating on the Internet due to the potential risk of a hacker breaching a web server security system and subsequently posting unauthorized material on the business' or individual's website. For example, a computer hacker may replace the images, text, or links which are normally displayed or embedded in a website with other unauthorized content which would damage the reputation of the business and potentially result in a loss of revenue.

Many systems and devices are currently available to prevent computer hackers from breaching a network and gaining unauthorized access to computer systems. These systems often rely on detecting unauthorized software applications (i.e. viruses) which are installed and/or running on computer systems. However, computer hackers may also alter a website's appearance using web elements which may not otherwise trigger actions in presently available web security systems. For example, a computer hacker may choose to place images or text content on a business' website which may not necessarily pose a threat to the health of the system or the health of a potential user's system. However, the images and/or text may contain messages and/or display images which may be inappropriate for customer viewing and consequently may harm the business' reputation and/or dissuade purchases and future web traffic at the affected site. Therefore, a company may wish to be alerted when such a website defacement occurs and may also desire that automated corrective actions be taken upon such an occurrence. For example, the company may wish to isolate the website or redirect web traffic to predetermined temporary websites following a defacement. Current security devices and anti-virus protection do not provide this defacement detection and prevention service.

The known security systems are of varying effectiveness and even the most effective security systems often allow security breaches to occur. As recognized by the present inventors, web administrators are not always monitoring the status of the websites for which they are responsible and therefore unauthorized content may be present on a website for prolonged periods of time without the web administrator's knowledge. Many online customers may therefore view the unauthorized content, which may consequently harm the public image of the business.

For the above-noted reasons, a system is needed for detecting the defacement of a website and taking appropriate corrective action when the defacement is detected.

SUMMARY OF THE INVENTION

The present invention describes a website defacement incident handling system and associated methodology for determining when a website has been defaced by an unauthorized user and in response to the detection, taking action to secure the website, correct vulnerabilities, and restore the website to normal operating status. The defacement incident handling system may work in concert with existing web security systems, or may be utilized as a stand-alone device.

The website defacement incident handling system analytically determines when a defacement has occurred using multiple factors. These factors include, for example, image comparisons of a web page snapshot image, text comparisons against lists of character strings inserted by an administrator to ascertain whether a website has been defaced, Uniform Resource Locator (URL) comparisons to determine whether a website is referring users to illegitimate websites, and comparisons of web site file properties such as file size and update time.

The exemplary factors listed above can each be analyzed by comparing reference web information derived from a reference web page information file against current web page information derived from a current web page information file. The current web page information file is retrieved at a predetermined interval for comparison against the reference web page information file, such that the website defacement incident handling system can determine whether a defacement has occurred during the elapsed interval.

An exemplary embodiment also includes snapshot image comparisons of the reference web page against the current web page, wherein each web page corresponds to respective web page information files. The system obtains a snapshot image, such as a JPEG or the like, of each website and performs a defined image comparison process to determine whether the current snapshot image has been altered relative to the reference snapshot image.

Each of the factor comparisons described above calculates a respective probability score which indicates the likelihood that a web page has been defaced. For example, the probability score could represent a confidence level based on the relative differences between the reference and current web page information and snapshot images. Higher confidence levels indicate a greater likelihood of defacement. In the exemplary embodiment, each probability score calculated in the above-described comparisons is aggregated for use in calculating an overall defacement probability score. The overall defacement probability score is compared to a predetermined threshold value and corrective actions for securing the web page are carried out when the threshold is exceeded.

As will be described in further detail below, a system including the features described above provides an effective way for businesses and other web site users to remotely monitor their websites against attacks which may be undetected by other Internet security and anti-virus systems.

The foregoing "background" description is for the purpose of generally presenting the context of the disclosure. Work of the inventors, to the extent it is described in this background section, as well as aspects of the description which may not otherwise qualify as prior art at the time of filing, is neither expressly or impliedly admitted as prior art against the present invention. The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the present advancements and many of the attendant advantages thereof will be readily obtained as the same becomes better understood by reference to the following detailed description when considered in connection with the accompanying drawings. However, the accompanying drawings and the exemplary depictions do not in any way limit the scope of the advancements embraced by the specification. The scope of the advancements embraced by the specification and drawings are defined by the words of the accompanying claims.

DETAILED DESCRIPTION OF THE EMBODIMENTS

Figure 1:
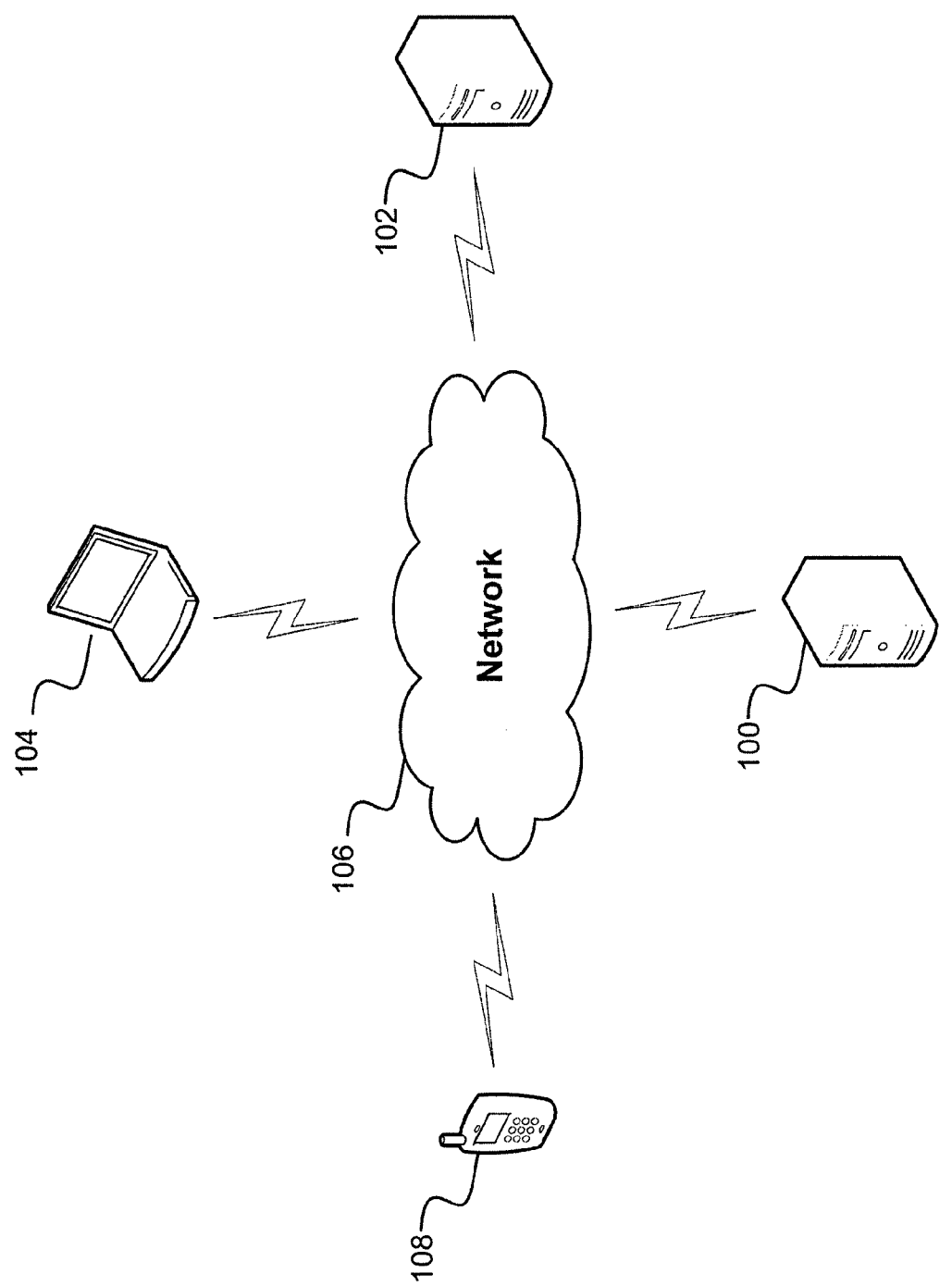
FIG. 1 is a schematic diagram of a website defacement incident handling system according to an exemplary embodiment.

Referring now to the drawings, wherein like reference numerals designate identical or corresponding parts throughout several views, the following description relates to a website defacement incident handling system and associated methodology for determining when a website has been altered by an unauthorized user and for taking corrective actions to protect the reputation of the website owner.

Specifically, as shown in the drawings and related discussion, when a web page is updated by an administrator or when a predetermined time has elapsed, a web page information file and a reference snapshot image of a web page is obtained and stored by the incident handling system. The web page information file contains, for example, a reference text string list which includes a list of text strings which have been inserted or intentionally omitted from a website for use in determining when a website has been altered illegitimately, a reference link list which contains a listing of all URL links currently authorized to be present on a website, and a reference file attribute list which includes, for example, the website's corresponding file size, update date, and permissions. The reference snapshot image is an image of the website, as displayed in part or in its entirety, for use as an image comparison. Additionally, the incident handling system obtains, at a second predetermined frequency, a current web page information file and current snapshot image of the web page for use in determining a defacement probability score. The defacement probability score is calculated using comparisons between the two information files and snapshot images. The calculated defacement score can then be compared with a predetermined threshold corresponding to a confidence level at which a defacement has likely occurred. Accordingly, corrective actions can then be taken and/or a website administrator alerted regarding the defacement of a website.

FIG. 1 is a schematic diagram of a web defacement incident handling system according to an exemplary embodiment. In FIG. 1, an incident handling system 100 is connected to a server 102, an unauthorized user 104, and a mobile device 108 via a network 106. The server 102 represents one or more servers connected to the mobile device 108, the unauthorized user 104, and the incident handling system 100 via network 106. The unauthorized user 104 represents one or more unauthorized user machines connected to incident handling system 100, mobile device 108, and server 102 via network 106. The mobile device 108 represents one or more mobile devices connected to incident handling system 100, unauthorized user 104, and server 102 via network 106. Network 106 represents one or more networks, such as the Internet, connecting incident handling system 100, server 102, unauthorized user 104, and mobile device 108. Incident handling system 100 includes an interface such as a keyboard or mouse, allowing a user to enter desired settings, such as the frequency at which the system checks for website defacement. In the exemplary embodiment, incident handling system 100 protects server 102 from being compromised by unauthorized user 104. The server 102 stores a plurality of web page information files, the web page information files typically including information for displaying web page images, text, and link referrals. Server 102 may optionally store log files indicating results of defacement checks and associated actions taken as a result of the checks.

A compromise by unauthorized user 104 may result in a website displaying unauthorized content to other web users on network 106. Therefore, when web page updates are performed or at a predetermined frequency, incident handling system 100 queries web information files stored on server 102 and compares current web information files from server 102 to reference web information files stored in incident handling system 100. As a result of these comparisons, a probability defacement score indicating the likelihood of a website defacement can be calculated and actions taken to isolate and alert users. For example, a user may be alerted via mobile device 108 by SMS texting or email. The alert may include a listing of defacements and corrective actions taken by incident handling system 100.

Incident handling system 100 uses a predetermined threshold value when performing the comparisons described above. This threshold corresponds to a confidence level at which defacement has likely occurred and may be defined by a user using the interface depending on particular preferences, such as a desire to decrease sensitivity and prevent possible false alarms.

The operation of each of the sections in the exemplary embodiment will now be described in further detail referring to FIGS. 2-8, 10A-B, and 11.

Figure 2:
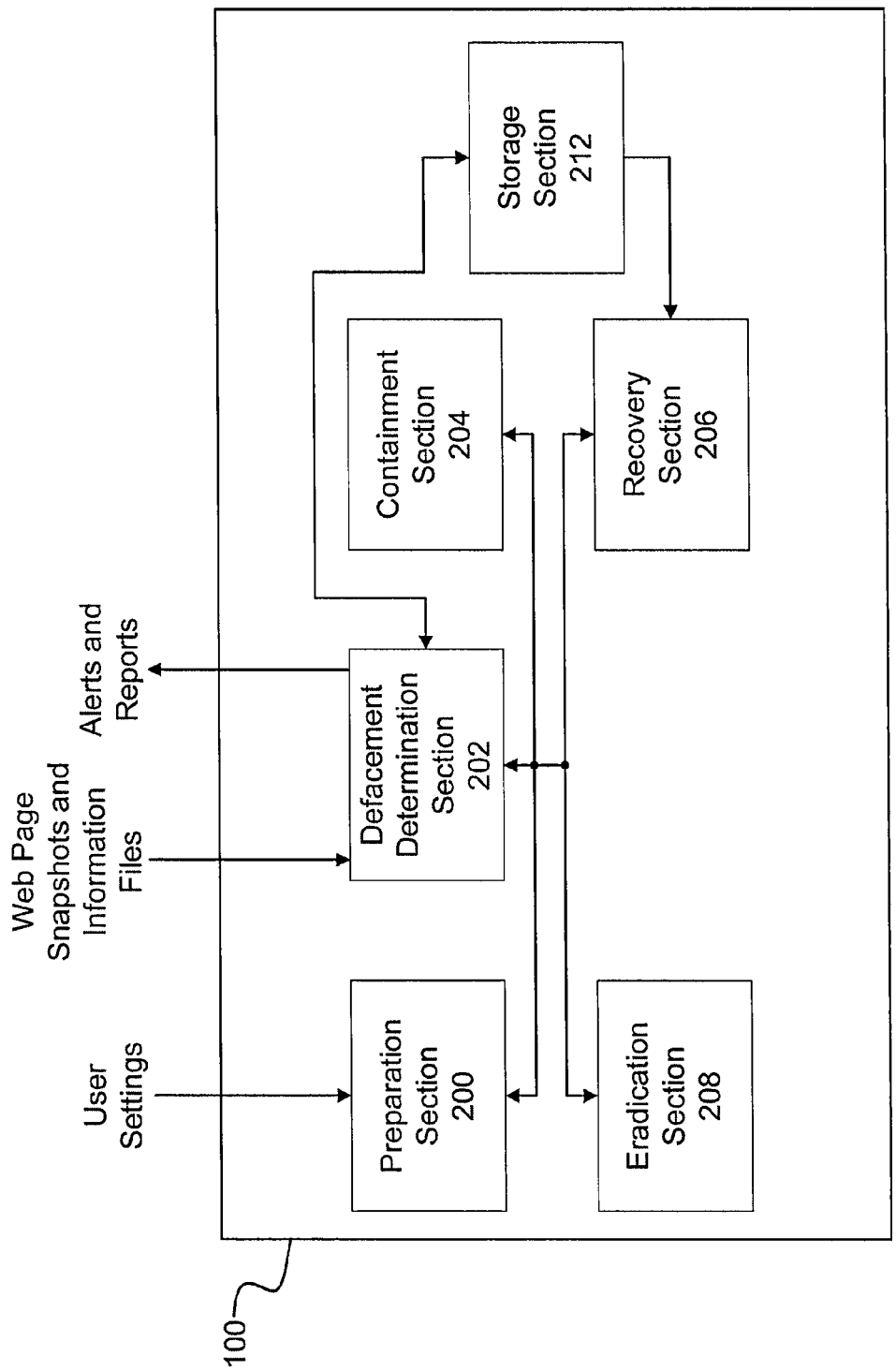
FIG. 2 is a schematic flow diagram of a website defacement incident handling system according to an exemplary embodiment.

FIG. 2 is an information flow diagram of a website defacement incident handling system according to an exemplary embodiment. In an exemplary embodiment, incident handling system 100 includes a preparation section 200, a defacement determination section 202, a containment section 204, a recovery section 206, and eradication section 208, and a storage section 212.

The preparation section 200 receives user settings indicating desired preferences for which the incident handling system will operate and also receives an input indicating when a web page has been updated. The user settings received in the preparation section 200 via the interface will be used by each of the other sections in incident handling system 100 to perform their respective functions.

Defacement determination section 202 performs the functions related to detecting a website defacement and alerting a user as to the website defacement. The operation of the defacement determination section 202 will now be described relative to the flow chart of FIG. 3.

Figure 3:
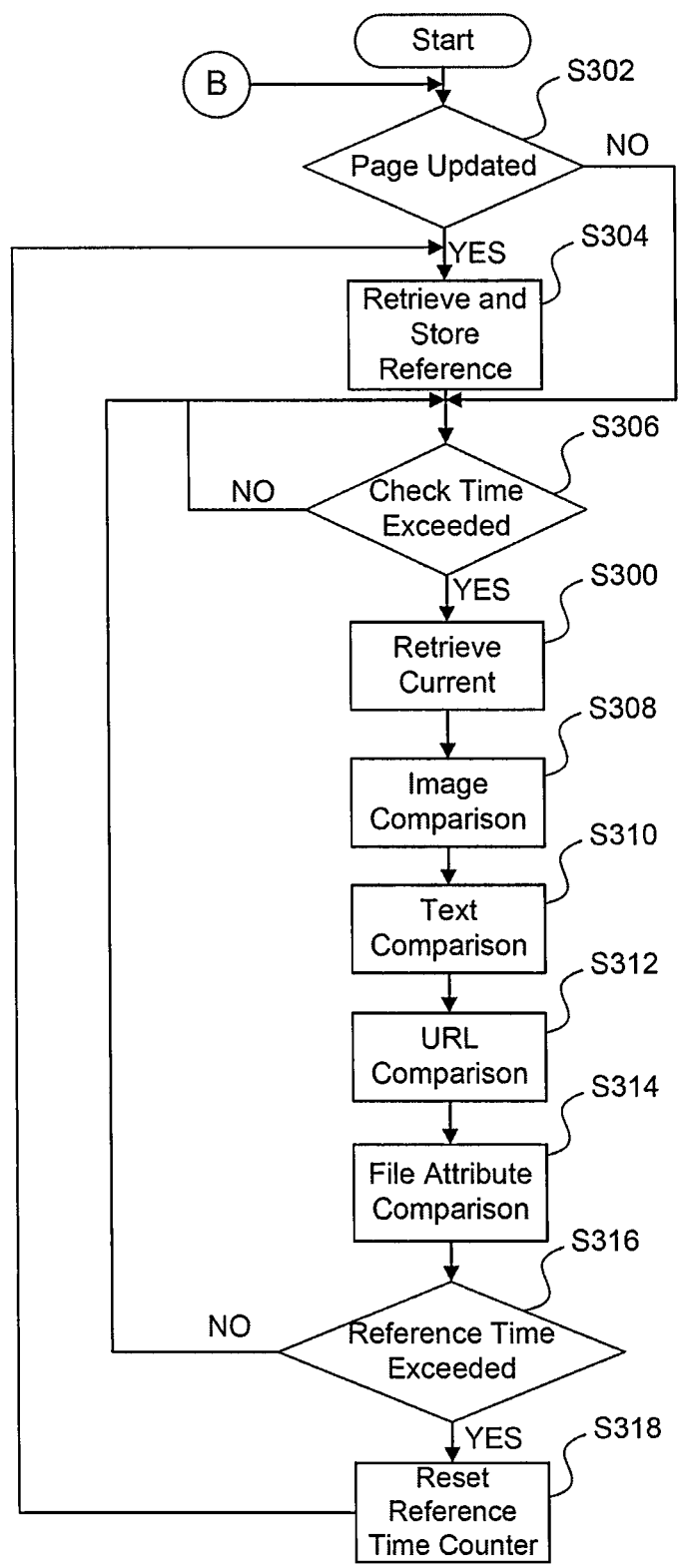
FIG. 3 is an algorithmic flow chart for a website defacement incident handling system according to an exemplary embodiment.

FIG. 3 is an algorithmic flow chart illustrating the defacement determination section 202 operation in an exemplary embodiment. When a web page associated with incident handling system 100 has been updated (S302) or when a predetermined user-defined time has elapsed (S316 and S318), defacement determination section 202 retrieves, via the interface and network, a reference web page information file and a reference snapshot image of a web page corresponding to the web page information file (S304). An input indicating that a web page associated with incident handling system 100 has been updated may be sent to, for example, the preparation section which would cause defacement determination section 202 to return to step S302. In the exemplary embodiment, the obtained web page information file includes a reference text string list, a reference link list, and a reference file attribute list. The web page information file and the reference snapshot image are stored in storage section 212.

When a second user-defined time has elapsed (S306), defacement determination section 202 obtains, via the interface, a current web page information file and a current snapshot image of the web page corresponding to the current web page information file (S300).

Figure 10A:
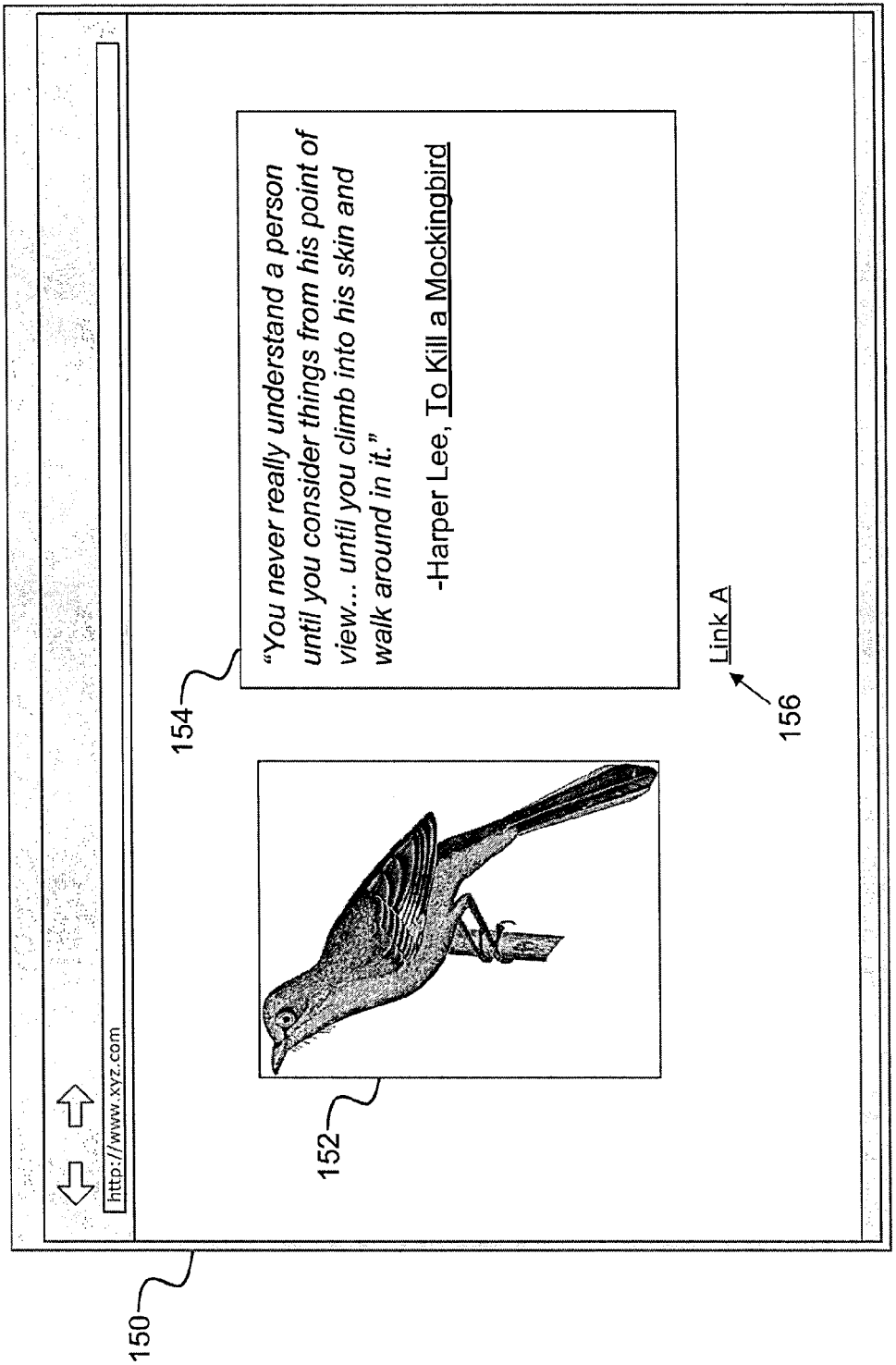
FIG. 10A is a reference website having an image, a text box, and a URL link according to an exemplary embodiment.
Figure 10B:
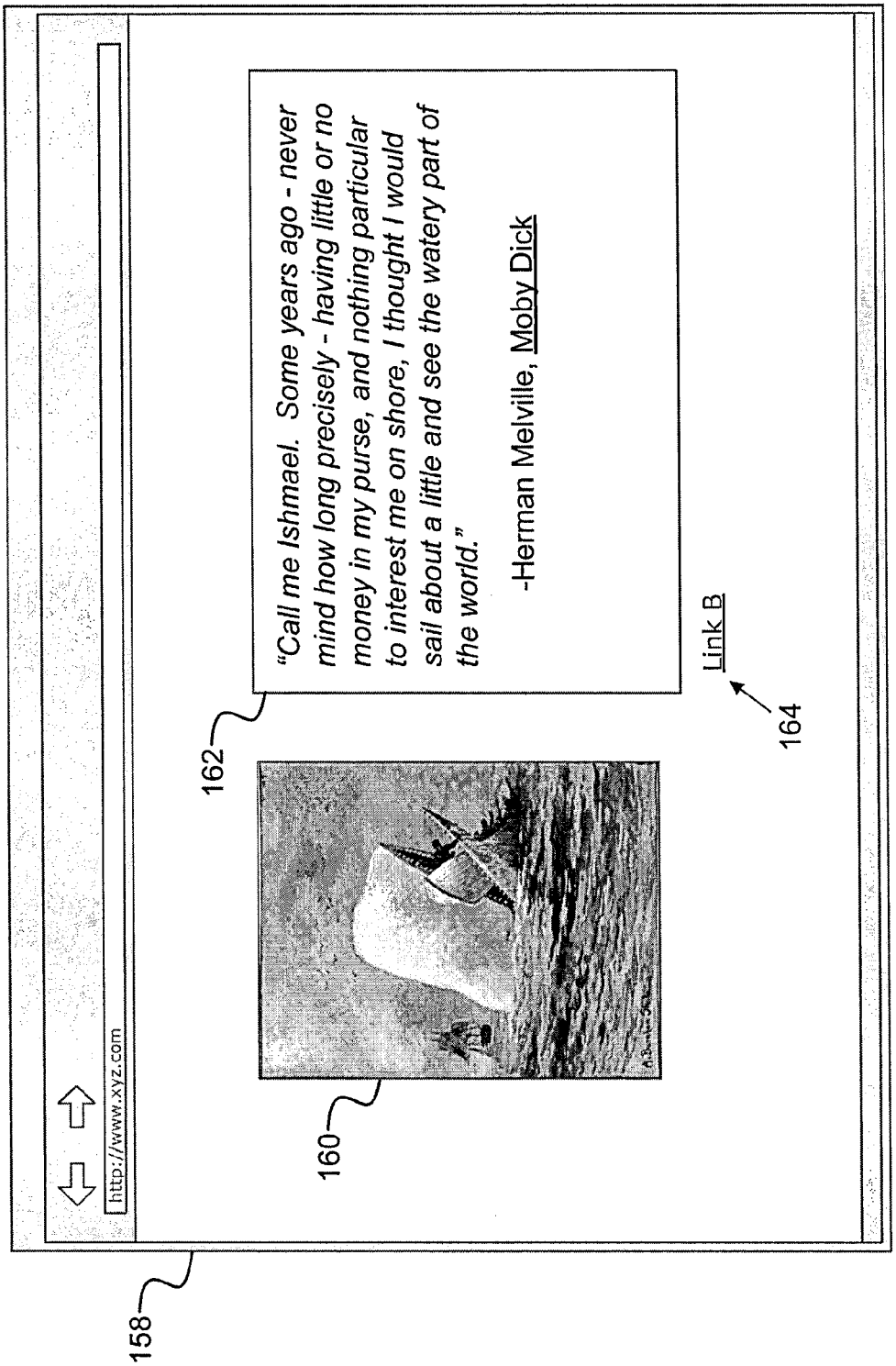
FIG. 10B is a current website having an image, a text box, and a URL link according to an exemplary embodiment.

Exemplary illustrations of a reference web page and a current web page are shown in FIGS. 10A and 10B. Referring to FIG. 10A, reference web page 150 includes image 152, text box 154, and link 156. Information for displaying each of these elements is contained in the web page information file corresponding to reference web page 150. Referring to FIG. 10B, current web page 158 includes image 160, text box 162, and link 164. Likewise, information for displaying each of these elements is contained in the web page information file corresponding to current web page 158.

Referring back to FIG. 3, once the user defined time has elapsed at step S306 and the current web page information file and snapshot are retrieved, defacement determination section 202 performs an image comparison of the reference snapshot image and the current snapshot image (S308). Image comparison step S308 will now be explained in further detail using the flow chart of FIG. 4.

Figure 4:
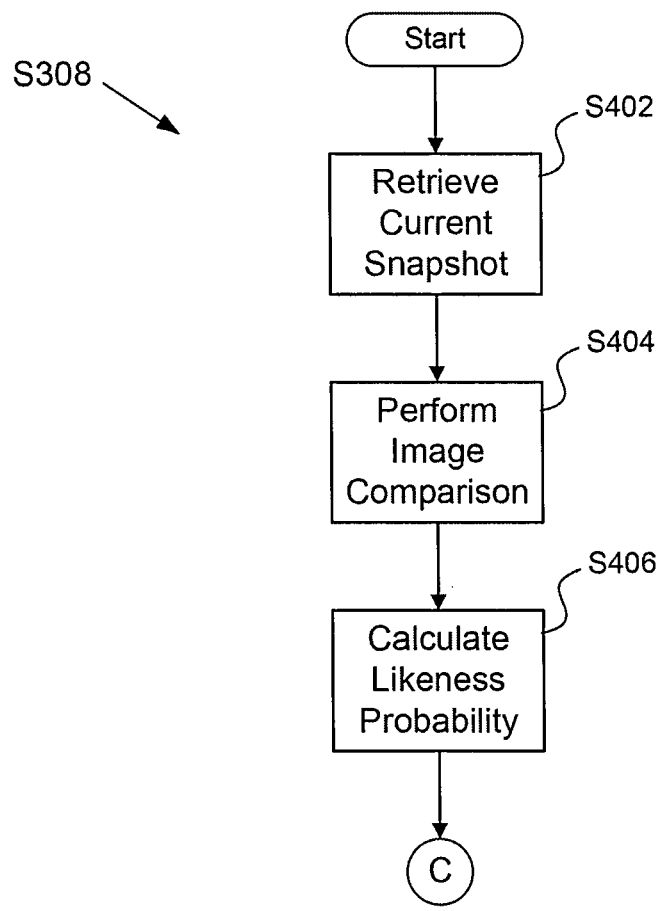
FIG. 4 is an algorithmic flow chart for performing an image comparisons in a website defacement incident handling system according to an exemplary embodiment.

Referring to FIG. 4, a current snapshot image is retrieved from the current web page at step S402. Using the current snapshot image, a comparison is performed against the reference snapshot image stored in storage section 212 (S404). The user may optionally choose to perform the image comparison using a cropped portion of the snapshot image, or the user may configure incident handling system 100 to perform an image comparison of the reference snapshot image and the current snapshot image in their entirety. Based upon the comparison of the two snapshot images, a value corresponding to an image likeness probability is calculated. The likeness probability is subsequently used in calculating the overall defacement probability score.

In an exemplary image comparison, referring to FIGS. 10A and 10B, images of reference web page 150 and current web page 158 in their entirety would be obtained using defacement determination section 202 and stored in storage section 212. At image comparison step S308, all or cropped portion of the snapshot images corresponding to the web pages would be compared and based on this comparison, a likeness probability would be calculated. For example, the image comparison at step S308 may determine, based on the differences in the snapshot images, that the images, text, and links, from reference web page 150 have been altered by an unauthorized user and changed to image 160, text box 162 and link 164 shown in current web page 158. In this case, the defacement determination section 202 would calculate a likeness probability indicating the relative differences between the snapshot images for use in calculating an overall defacement probability score.

In an exemplary embodiment, the user may distinguish particular structural elements of the web site which will be checked during image comparison. For example, when providing settings to the preparation section, the user may elect to check only static portions of the web site, such as the header, using image comparison. Alternatively, the user may direct the system to only perform image comparisons on structural elements which normally change frequently, such as an area for displaying news headlines.

Referring back to FIG. 3, the reference web page information file retrieved at step S304 includes a reference text string list indicating a list of included or excluded character strings which could be inserted as a key to an administrator in order to confirm whether a site has been changed illegitimately. For example, selected text strings drawn from text box 154 of FIG. 10A could be chosen for inclusion in the reference text string list. Alternatively, selected words could be "red flagged" and listed in the reference text string list, such that their inclusion in a web page would likely indicate that a defacement occurred. The text comparison performed at step S310 will now be described in greater detail using FIG. 5.

Figure 5:
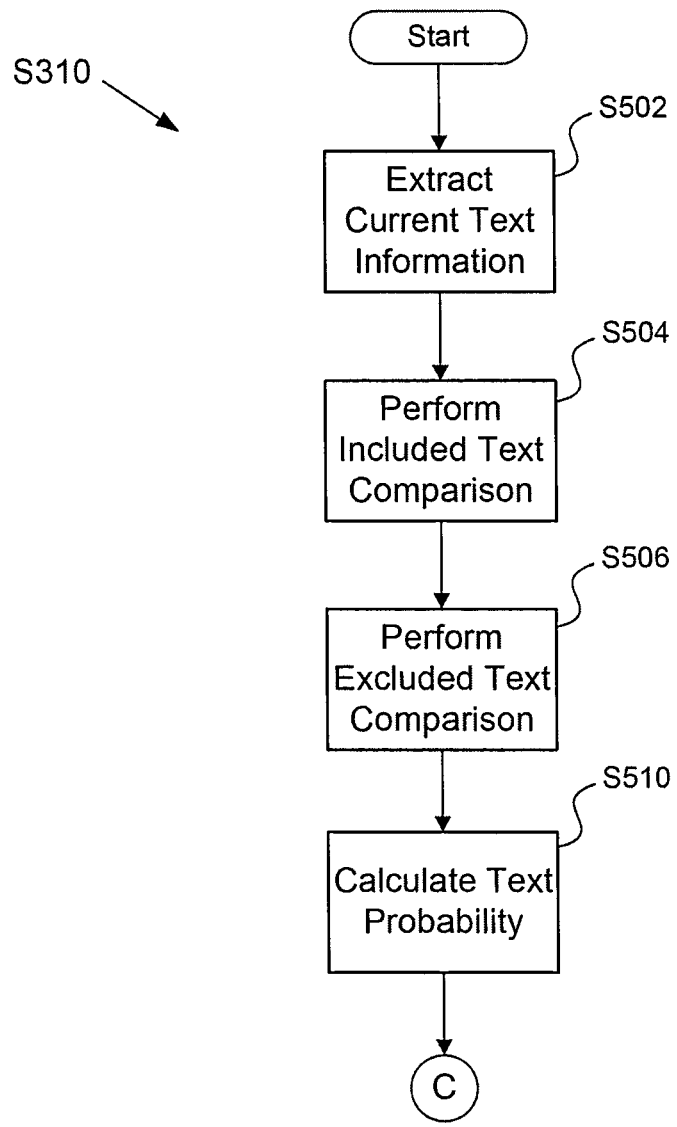
FIG. 5 is an algorithmic flow chart for performing text comparisons in a website defacement incident handling system according to an exemplary embodiment.

Referring to FIG. 5, at step S502, current text information is extracted from the current web page information file retrieved at step S300. The text could be shown in readable HTML format or may be embedded as hidden text. In an exemplary embodiment, the extraction is performed using a method such as a coded read and compare callable function. Using the extracted current text information, a comparison is made at step S504 against the reference text string list to determine whether the "included" text strings from the reference text string list are included in the current text information. Additionally, at step S506, the system compares the current text information with a list of excluded text contained in the reference text string list. Inclusion of any character strings contained in the excluded text list would indicate that a defacement has possibly occurred. Based on the comparisons described above, a text probability value is calculated at step S510 for use in calculating the overall defacement probability score.

In an exemplary text comparison, referring to FIG. 10B, text information would be extracted from the information file of current web page 158 (i.e. the text in text box 162) and, using a reference text string list stored in storage section 212, defacement determination section 202 would compare the extracted text information with the reference text list to determine whether the character strings included in the reference text string list are present in the extracted text from text box 162. For example, the text string "foolishness" from reference web page 150 may be listed in the reference text string list. A comparison against the current text information would show that the listed text string is not present in current web page 158 and an appropriate text probability would be calculated. Additionally, an administrator may choose to search extracted text from the current web page for a list of character strings which should be excluded from the web page. For example, the text string "money" may be listed as excluded text in the reference text string list. A comparison against the current text information would show that the listed text string is present in the current web page 158 and an appropriate text probability would be calculated.

Referring back to FIG. 3, at URL comparison step S312, current link information is extracted from the current web page information file obtained at step S300. The current link information is compared with a reference link list stored in the reference web page information file contained in storage section 212. URL comparison step S312 will now be described in further detail using FIG. 6.

Figure 6:
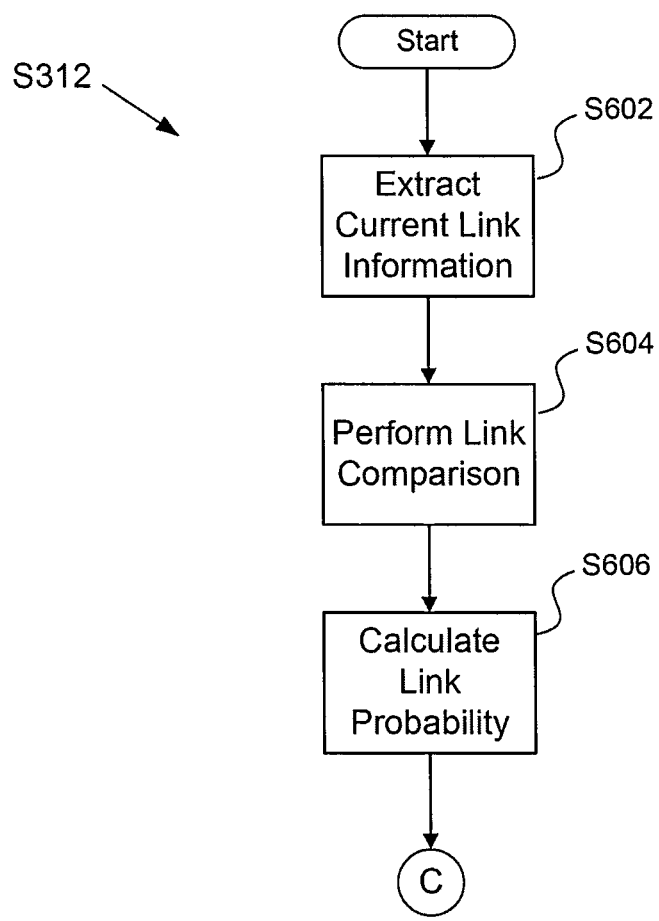
FIG. 6 is an algorithmic flow chart for performing URL link comparisons in a website defacement incident handling system according to an exemplary embodiment.

Referring to FIG. 6, at step S602, current link information is extracted from the current web page file obtained at step S300. Using the extracted current link information, a link comparison step is performed at step S604, which includes the verification of all links contained in the reference link list against the links extracted from the current web page information file. In an exemplary embodiment, the link verification may be configured to operate in conjunction with existing spyware, malware, or child protection filters installed on a user's computer or with third party URL checkers on the Internet. Additionally, the reference link list may be continually updated based on a determination that a link directs users to undesired content. The updating of the reference link list may be based on user input or the detection of malicious content on a web page. Based on the comparison of the extracted link information and the reference link list stored in the storage section 212, a link probability score is calculated for use in calculating the defacement probability score.

For example, referring to FIG. 10B, information pertaining to link 164 contained in the web page information file corresponding to current web page 158 is compared with a reference link list for reference web page 150. In this case, the reference web page information file would contain a reference link list which contains information for displaying link 156. In performing the comparison, incident handling system 100 would, for example, determine that the link corresponding to link 156 in the reference web page has been changed to the link corresponding to link 164 in the current web page. Consequently, a link probability score is calculated indicating that the link contained in the reference web page 150 has been changed in the current web page 158.

Figure 7:
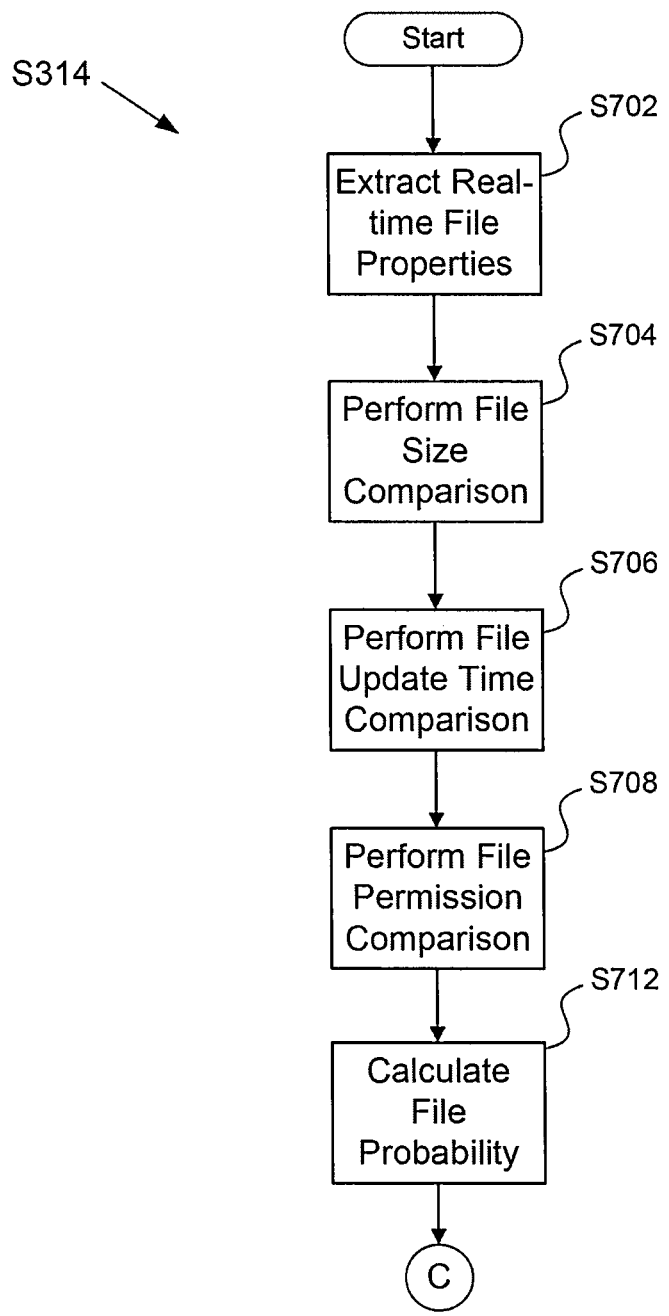
FIG. 7 is an algorithmic flow chart for performing file attribute comparisons in a website defacement incident handling system according to an exemplary embodiment.

Next, the file attribute checking step S314 in FIG. 3 will be explained in further detail using the flow chart of FIG. 7. At step S702, current file attributes are extracted from the current web page information file obtained at step S300. Using the extracted current file attributes, a file size comparison check is performed at step S704. At step S706, a comparison of file update times in the current file attributes and the reference file attribute list are compared. At step S708, the file permissions of the current web page and the permissions of the reference file attribute lists are compared. Using the foregoing comparisons, a file probability score is calculated at step S710 for use in calculating the overall defacement probability score. The above-mentioned file attributes are non-limiting examples and one of ordinary skill in the art would recognize that other file attributes could be examined when calculating a file probability score. For example, file hashing may be implemented in a web page's HTML file and the incident handling system may be optionally configured to analyze attributes associated with file hashing. As such, a hash code representing an ID of a file content may be generated via a hashing function, such as MD5, and compared to new hash codes generated when the content of the web page has changed.

Figure 11:
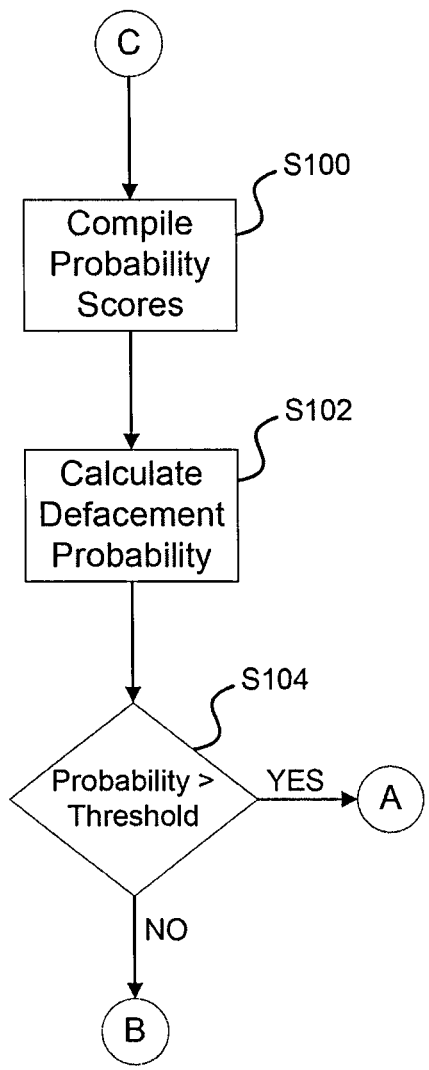
FIG. 11 is an algorithmic flow chart for determining defacement probability in a website defacement incident handling system according to an exemplary embodiment

The calculation of the overall defacement probability score will now be explained in further detail using FIG. 11. At step S100, the probability scores calculated in the foregoing defacement determination checks for image comparison, text comparison, link comparison, and file attribute comparison are compiled. Using the compiled scores, a predetermined formula is used in calculating a defacement probability score which indicates the likelihood that the website being analyzed has been defaced by an unauthorized user. The incident handling system user may optionally choose to weight each respective probability score according to user preferences and/or historical accuracy at which each of the individual probability scores has predicted a website defacement. For example, training data analyzed by the system may indicate that image comparisons predict defacements at a higher confidence level than file attribute comparisons. Accordingly, incident handling system is configured to apply use a weighted defacement probability score calculation, with the likeness probability score receiving a higher weight than the file probability score.

For illustration purposes, and as a non-limiting example, the probability scores calculated in steps S308-S314 are:
 Likeness Probability=0.85
 Text Probability=0.92
 Link Probability=0.00
 File Probability=0.41
In an exemplary embodiment, each respective probability score corresponds to the confidence level for predicted defacement. In the above example, defacement determination section 202 calculates an 85% probability that the analyzed website has been defaced based on a comparison of snapshot images. The example probability scores, for example, could be summed to determine an overall defacement probability. Alternatively, as a non-limiting example, a weighted average may be calculated. The incident handling system 100 may optionally be configured to accept setting changes related to the defacement probability score formula when other predictive mathematical models are desired.

At step S104, the calculated defacement probability score is compared against a predetermined threshold. When the calculated defacement probability score exceeds the threshold, a defacement alert is output and incident handling apparatus 100 takes appropriate corrective action in accordance with the operation of containment section 204, recovery section 206, and eradication section 208 shown in FIG. 2. The operation of each of the aforementioned corrective action sections shown in FIG. 2 will now be explained in further detail using the flow chart of FIG. 8.

When a defacement alert is output, containment section 204 performs steps related to isolating and/or redirecting web traffic from the affected website at containment step S802. For example, when defacement determination section 202 determines that a website has been defaced by an unauthorized user, the web administrator may optionally choose to isolate the website and remove all web traffic in order to preserve the website owner's reputation. Alternatively, the website administrator may optionally choose for the containment section to redirect all web traffic corresponding to the affected web page to a predetermined temporary web page stored in the web server. In this case, for example, customers seeking to purchase goods from a website which has been defaced may be redirected to a site indicating that the affected website is temporarily unavailable or to a mirror website containing identical information to the affected website. This ensures users are unaware of the website defacement and helps prevent any possible harm to the business that could have arisen due to the defacement. The blocking and/or redirecting of users may occur at an installed firewall, router, or DNS server on the network.

Figure 8:
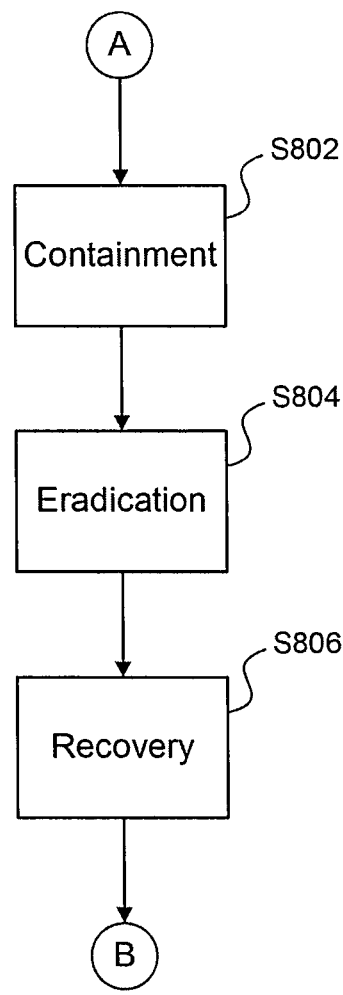
FIG. 8 is a algorithmic flow chart for performing corrective actions following defacement detection in an incident handling system according to an exemplary embodiment.

Following the containment of the affected web page at step S802, eradication section 208 performs the steps shown at step S804 of FIG. 8 for eradicating the affected web page. In the exemplary embodiment, eradication section 208 at step S804 may replace the current web page information file on the affected web server with the reference web page information file stored in storage section 212. Additionally, a defacement summary report may be generated and sent to an external device, such as mobile device 109, indicating, for example, the date and time of the incident, a snapshot image of the current website, a list of missing or inserted text keywords, URLs inserted illegitimately, website communication status, a list of corrective actions taken, a list of remaining interface vulnerabilities, and a link to perform further corrective actions remotely. Based on the information contained in the defacement summary report, a web administrator may choose to take appropriate action regarding whether to further isolate the website or whether risk has sufficiently been mitigated so as to continue operating.

Recovery section 206 performs steps related to recovering the affected website and restoring normal web traffic. At step S806, the recovery section 206 may, in the exemplary embodiment, restore normal web traffic to the web page corresponding to the current web page information file when the calculated defacement probability score has decreased below the level of the threshold. Additionally, the recovery section 206 may also take action to restore the default settings which were changed by the corrective actions performed by the aforementioned containment section 204 and eradication section 208.

Referring back to the flow chart of FIG. 3, following the comparison checks and the corrective actions taken as appropriate, the defacement determination section 202 determines whether a predetermined time between obtaining reference snapshots and web page information files has been exceeded and, if necessary, obtains an up-to-date reference web page information file and snapshot image from the web server 102. In this case, the time counter corresponding to the time between obtaining reference snapshots is reset at step S318. In any case, the defacement determination section 202 returns to performing the initial defacement determination checks of images, text, links, and file attributes as described above.

A system which includes the features in the foregoing description provides numerous advantages to users. In particular, the system monitors a user's website continuously to determine whether a defacement has occurred. Since the defacement does not necessarily include a virus or other similar program, previous Internet security systems would not detect an unauthorized alteration of website content. Consequently, website owners may be unaware that their website is defaced, which in the case of online businesses may result in public embarrassment and loss of customers. The present invention addresses this concern by providing analytical determinations of defacements and the performance of corrective actions as required.

The operation of the foregoing device and steps performed in the exemplary flow charts provide a single embodiment of the device and methodology of the present disclosure. One of ordinary skill in the art may optionally choose to perform all or a selected subset of the aforementioned steps, or may alternatively choose to perform the steps in a alternate order or to perform certain steps in parallel or series.

Figure 9:
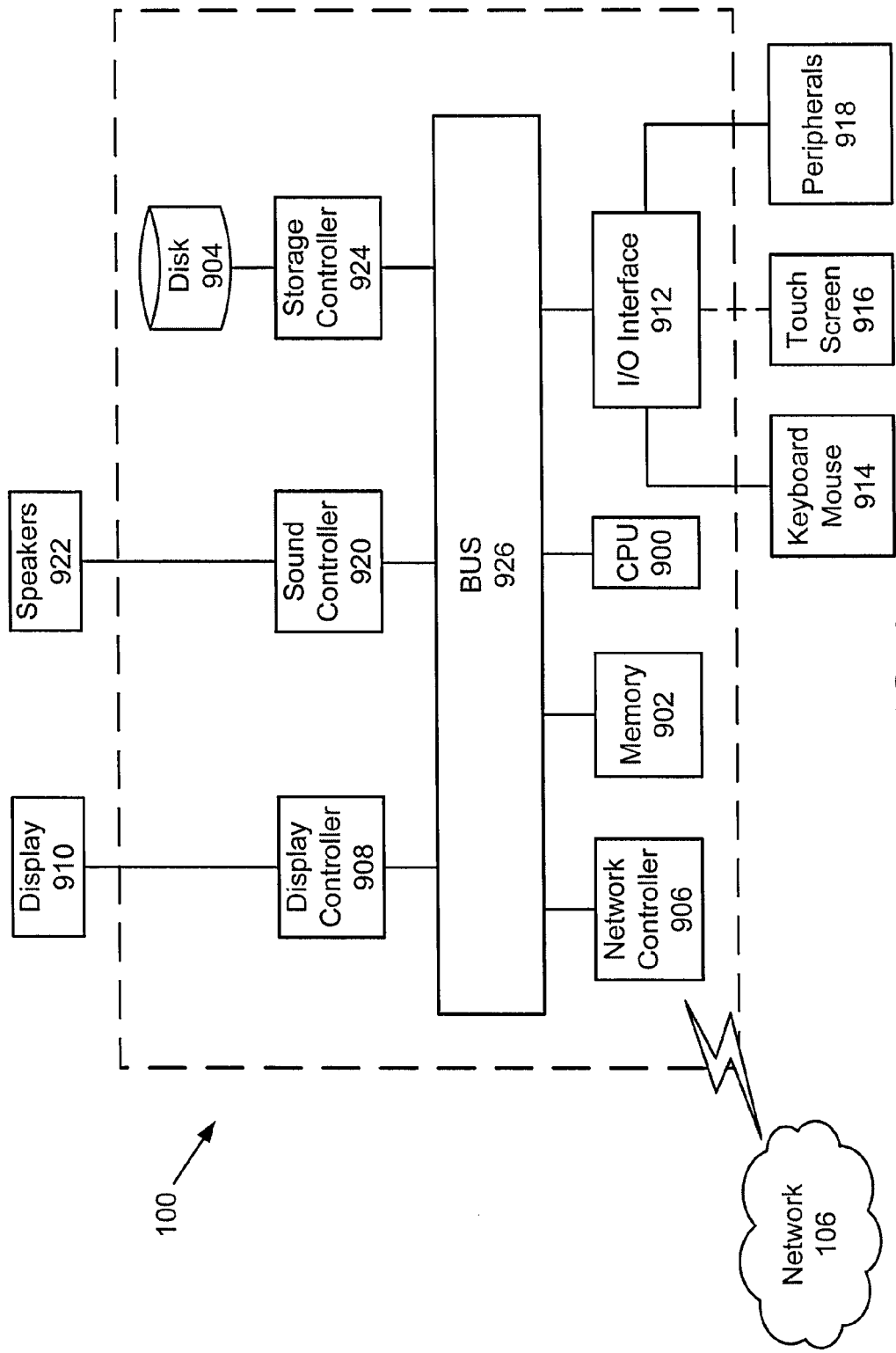
FIG. 9 is a schematic diagram of a website defacement incident handling system according to an exemplary embodiment.

Next, a hardware description of incident handling system 100 according to exemplary embodiments is described with reference to FIG. 9. In FIG. 9, incident handling system 100 includes a CPU 900 which performs the processes described above. The process data and instructions may be stored in memory 902. These processes and instructions may also be stored on a storage medium disk X04 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer aided design station communicates, such as a server or computer.

Further, the claimed advancements may be provided as a utility application, background daemon, or component of an operating system, or combination thereof, executing in conjunction with CPU 900 and an operating system such as Microsoft Windows 7, UNIX, Solaris, LINUX, Apple MAC-OS and other systems known to those skilled in the art.

CPU 900 may be a Xenon or Core processor from Intel of America or an Opteron processor from AMD of America, or may be other processor types that would be recognized by one of ordinary skill in the art. Alternatively, the CPU 900 may be implemented on an FPGA, ASIC, PLD or using discrete logic circuits, as one of ordinary skill in the art would recognize. Further, CPU 900 may be implemented as multiple processors cooperatively working in parallel to perform the instructions of the inventive processes described above.

The incident handling system 100 in FIG. 9 also includes a network controller 906, such as an Intel Ethernet PRO network interface card from Intel Corporation of America, for interfacing with network 106. As can be appreciated, the network 106 can be a public network, such as the Internet, or a private network such as an LAN or WAN network, or any combination thereof and can also include PSTN or ISDN sub-networks. The network 106 can also be wired, such as an Ethernet network, or can be wireless such as a cellular network including EDGE, 3G, and 4G wireless cellular systems. The wireless network can also be WiFi, Bluetooth, or any other wireless form of communication that is known.

The incident handling system 100 further includes a display controller 908, such as a NVIDIA GeForce GTX or Quadro graphics adaptor from NVIDIA Corporation of America for interfacing with display 910, such as a Hewlett Packard HPL2445w LCD monitor. A general purpose I/O interface 912 interfaces with a keyboard and/or mouse 914 as well as a touch screen panel 916 on or separate from display 910. General purpose I/O interface also connects to a variety of peripherals 918 including printers and scanners, such as an OfficeJet or DeskJet from Hewlett Packard.

A sound controller 920 is also provided in incident handling system 100, such as Sound Blaster X-Fi Titanium from Creative, to interface with speakers/microphone 922 thereby providing sounds and/or music. The speakers/microphone 922 can also be used to accept dictated words as commands for controlling incident handling system 100 or for providing location and/or property information with respect to the associated websites.

The general purpose storage controller 924 connects the storage medium disk 904 with communication bus 926, which may be an ISA, EISA, VESA, PCI, or similar, for interconnecting all of the components of incident handling system 100. A description of the general features and functionality of the display 910, keyboard and/or mouse 914, as well as the display controller 908, storage controller 924, network controller 906, sound controller 920, and general purpose I/O interface 912 is omitted herein for brevity as these features are known.

Obviously, numerous modifications and variations of the present invention are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A web page defacement detection apparatus comprising:
   a memory;
   an interface connected to a network having a web server configured to store a plurality of web page information files; and
   a processor programmed to
      obtain, via the interface at a predetermined first frequency or when a web page is updated by an authorized user, a web page information file and a reference snapshot image of the web page corresponding to the web page information file, the web page information file including a reference text string list, a reference link list, and a reference file attribute list;
      store the web page information file and the reference snapshot image in the memory;
      obtain, via the interface at a predetermined second frequency and after obtaining the reference snapshot image and web page information file, a current web page information file and a current snapshot image of the web page corresponding to the current web page information file;
      extract, after obtaining the current web page information file, current text information, current link information, and current file attributes from the current web page information file;
      perform an image comparison of the current snapshot image and the reference snapshot image stored in the memory and, based on the comparison, calculate a first value;
      compare the current text information with the reference text string list stored in the memory and, based on the comparison, calculate a second value;
      compare the current link information with the reference link list stored in the memory and, based on the comparison, calculate a third value;
      compare the current file attributes with the reference file attribute list stored in the memory and, based on the comparison, calculate a fourth value;
      calculate a defacement probability score based on the first, second, third, and fourth values;
      compare the defacement probability score with a threshold; and
      output a defacement alert when the defacement probability score is greater than or equal to the threshold.

2. The web page defacement detection apparatus according to claim 1, wherein
   the defacement probability score is calculated based on a predetermined formula which includes the first, second, third, and/or fourth values such that each of the values are weighted based an accuracy level indicating relative probability of correctly predicting a web page defacement.

3. The web page defacement detection apparatus according to claim 1, wherein the snapshot images include all static objects and structural elements displayed on the corresponding web pages.

4. The web page defacement detection apparatus according to claim 1, wherein the image comparison of the current snapshot image and the reference snapshot image stored in the memory is performed based on comparing predetermined portions of the snapshot images, the portions being of areas less than the entire image.

5. The web page defacement detection apparatus according to claim 1, wherein the processor is further programmed to, when a defacement alert is output, isolate, via a containment section, the web page corresponding to the current web page information file.

6. The web page defacement detection apparatus according to claim 5, wherein the processor is further programmed to, when a defacement alert is output, re-direct, via the containment section, web traffic from the web page corresponding to the current web page information file to a predetermined temporary web page.

7. The web page defacement detection apparatus according to claim 6, wherein the processor is further programmed to, in response to the web page corresponding to the current web page file being isolated or the web traffic being re-directed, restore, via a recovery section, web traffic to the web page corresponding to the current web page file when the defacement probability score is less than the threshold.

8. The web page defacement detection apparatus according to claim 7, wherein the processor is further programmed to, when a defacement alert is output:
   replace, via an eradication section, the current web page information file on the web server with the reference web page information file; and
   generate a defacement summary report and send the defacement report to an external device, the defacement summary report including a time of defacement, a list of corrective actions taken, and a list of interface vulnerabilities which could potentially result in further defacements.

9. A web page defacement detection method, implemented by a web page defacement detection apparatus, comprising:
- obtaining, via a processor of the web page defacement detection apparatus at a predetermined first frequency or when a web page is updated by an authorized user, a web page information file and a reference snapshot image of the web page corresponding to the web page information file, the web page information file including a reference text string list, a reference link list, and a reference file attribute list;
- storing the web page information file and the reference snapshot image in a memory;
- obtaining, via the processor at a predetermined second frequency and after obtaining the reference snapshot image and web page information file, a current web page information file and a current snapshot image of the web page corresponding to the current web page information file;
- extracting, via the processor and after obtaining the current web page information file, current text information, current link information, and current file attributes from the current web page information file;
- performing, via the processor, an image comparison of the current snapshot image and the reference snapshot image stored in the memory and, based on the comparison, calculating a first value;
- comparing, via the processor, the current text information with the reference text string list stored in the memory and, based on the comparison, calculating a second value;
- comparing, via the processor, the current link information with the reference link list stored in the memory and, based on the comparison, calculating a third value;
- comparing, via the processor, the current file attributes with the reference file attribute list stored in the memory and, based on the comparison, calculating a fourth value;
- calculating, via the processor, a defacement probability score based on a predetermined formula which includes the first, second, third, and fourth values;
- comparing, via the processor, the defacement probability score with a threshold; and
- outputting a defacement alert when the defacement probability score is greater than or equal to the threshold.

10. The web page defacement detection method according to claim 9, wherein the defacement probability score is calculated based on a predetermined formula which includes the first, second, third, and fourth values such that each of the values are weighted based a accuracy level indicating relative probability of correctly predicting a web page defacement.

11. The web page defacement detection method according to claim 9, wherein the snapshot images include all static objects and structural elements displayed on the corresponding web pages.

12. The web page defacement detection method according to claim 9, wherein the image comparison of the current snapshot image and the reference snapshot image stored in the memory is performed based on comparing predetermined portions of the snapshot images, the portions being of areas less than the entire image.

13. The web page defacement detection method according to claim 9, further comprising:
- isolating, via the processor, the web page corresponding to the current web page information file when a defacement alert is output.

14. The web page defacement detection method according to claim 13, further comprising:
- re-directing, via the processor, web traffic from the web page corresponding to the current web page information file to a predetermined temporary web page stored in the web server when a defacement alert is output.

15. The web page defacement detection method according to claim 14, further comprising:
- restoring, via the processor in response to the web page corresponding to the current web page file being isolated or the web traffic being re-directed, web traffic to the web page corresponding to the current web page file when the defacement probability score is less than the threshold.

16. The web page defacement detection method according to claim 15, further comprising, via the processor when a defacement alert is output:
- replacing the current web page information file on the web server with the reference web page information file; and
- generating a defacement summary report and sending the defacement report to an external device, the defacement summary report including a time of defacement, a list of corrective actions taken, and a list of interface vulnerabilities which could potentially result in further defacements.

17. A non-transitory computer readable medium having computer-readable instructions stored therein for detecting web page defacement that when executed by a computer causes the computer to perform a method comprising:
- obtaining, via a processor of the web page defacement detection apparatus at a predetermined first frequency or when a web page is updated by an authorized user, a web page information file and a reference snapshot image of the web page corresponding to the web page information file, the web page information file including a reference text string list, a reference link list, and a reference file attribute list;
- storing the web page information file and the reference snapshot image in a memory;
- obtaining, via the processor at a predetermined second frequency and after obtaining the reference snapshot image and web page information file, a current web page information file and a current snapshot image of the web page corresponding to the current web page information file;
- extracting, via the processor and after obtaining the current web page information file, current text information, current link information, and current file attributes from the current web page information file;
- performing, via the processor, an image comparison of the current snapshot image and the reference snapshot image stored in the memory and, based on the comparison, calculating a first value;
- comparing, via the processor, the current text information with the reference text string list stored in the memory and, based on the comparison, calculating a second value;
- comparing, via the processor, the current link information with the reference link list stored in the memory and, based on the comparison, calculating a third value;
- comparing, via the processor, the current file attributes with the reference file attribute list stored in the memory and, based on the comparison, calculating a fourth value;
- calculating, via the processor, a defacement probability score based on a predetermined formula which includes the first, second, third, and fourth values;
- comparing, via the processor, the defacement probability score with a threshold; and outputting a defacement alert when the defacement probability score is greater than or equal to the threshold.

* * * * *